(12) United States Patent
Simonin et al.

(10) Patent No.: US 10,525,497 B2
(45) Date of Patent: Jan. 7, 2020

(54) METHOD OF INJECTING A LIQUID BETWEEN TWO PANELS, AND A TOOL THEREFORE

(71) Applicant: GM GLOBAL TECHNOLOGY OPERATIONS LLC, Detroit, MI (US)

(72) Inventors: Matthew P. Simonin, Ortonville, MI (US); Robert N. Saje, Shelby Township, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 353 days.

(21) Appl. No.: 15/380,285

(22) Filed: Dec. 15, 2016

(65) Prior Publication Data

US 2018/0169918 A1 Jun. 21, 2018

(51) Int. Cl.
| | |
|---|---|
| B05C 5/00 | (2006.01) |
| B05C 17/01 | (2006.01) |
| B05C 17/005 | (2006.01) |
| B05C 9/12 | (2006.01) |
| B05C 21/00 | (2006.01) |
| F16B 5/00 | (2006.01) |
| F16B 11/00 | (2006.01) |

(52) U.S. Cl.
CPC ............... *B05C 5/00* (2013.01); *B05C 9/12* (2013.01); *B05C 21/00* (2013.01); *F16B 5/00* (2013.01); *F16B 11/006* (2013.01)

(58) Field of Classification Search
CPC . F16B 5/00; F16B 11/006; B05C 9/12; B05C 5/00; B05C 21/00; B05C 17/01; B05C 17/005
See application file for complete search history.

(56) References Cited

U.S. PATENT DOCUMENTS

| | | | | |
|---|---|---|---|---|
| 4,065,034 | A * | 12/1977 | Callan | B05C 3/132 222/146.5 |
| 4,390,115 | A * | 6/1983 | Bigham | B05C 17/0123 222/326 |
| 5,299,464 | A * | 4/1994 | Bennett | G01N 33/28 137/315.41 |
| 5,617,698 | A * | 4/1997 | Guilmette | B25B 5/06 248/205.6 |

(Continued)

FOREIGN PATENT DOCUMENTS

CN 104117471 A * 10/2014 ........... B65D 83/207

*Primary Examiner* — Nahida Sultana
*Assistant Examiner* — Debjani Roy
(74) *Attorney, Agent, or Firm* — Quinn IP Law

(57) ABSTRACT

A method of injecting a liquid between a first panel and a second panel positioned flat against each other includes providing a tool defining an internal passageway having an inlet and an outlet. The first panel and the second panel are separated with the tool, to form a pocket between the first panel and the second panel, such that the outlet of the passageway is positioned in fluid communication with the pocket. A liquid source is connected to the inlet of the passageway to supply a liquid to the passageway. The liquid is injected into the pocket formed between the first panel and the second panel through the outlet of the passageway of the tool. The pocket is compressed or flattened to wet-out the liquid. The pocket may be compressed with the separating and injecting tool, or with a different device, such as a compressor or clamp.

19 Claims, 9 Drawing Sheets

(56) References Cited

U.S. PATENT DOCUMENTS

| | | | |
|---|---|---|---|
| 6,349,857 B1* | 2/2002 | Lepsius | B05C 17/005 |
| | | | 222/391 |
| 2016/0214121 A1* | 7/2016 | Ullett | B05C 17/00516 |

* cited by examiner

METHOD OF INJECTING A LIQUID BETWEEN TWO PANELS, AND A TOOL THEREFORE

INTRODUCTION

The disclosure generally relates to a method of injecting a liquid between two panels positioned flat against each other, and a tool therefor.

The manufacture of some assemblies requires that a first panel be positioned flat against a second panel. Often the first panel and the second panel are bonded to each other with an adhesive disposed between the two panels along a joint or hem. Other assemblies require a sealant disposed between the two adjacent panels. Typically, during initial assembly, the adhesive or sealant is applied to a surface of one of the panels prior to the other panel being positioned against it. However, once the panels are assembled, getting the adhesive or sealant between the two panels may require the disassembly or complete separation of the panels in order to re-apply the adhesive or sealant.

SUMMARY

A method of injecting a liquid between a first panel and a second panel positioned against each other is provided. The method includes providing a tool defining an internal passageway having an inlet and an outlet. The first panel and the second panel are separated with the tool, to form a pocket between the first panel and the second panel, such that the outlet of the passageway is positioned in fluid communication with the pocket. A liquid is injected into the pocket formed between the first panel and the second panel through the outlet of the passageway of the tool.

In one aspect of the method, a source is connected to the inlet of the passageway to supply the liquid to the passageway.

In another aspect of the method, the pocket is compressed after the liquid is injected into the pocket to provide wet-out of the liquid. In another aspect of the method, the tool is removed after injecting the liquid into the pocket and before compressing the pocket.

In one aspect of the method, compressing the pocket may include compressing the pocket with a compressor. In another aspect of the method, compressing the pocket may include compressing the pocket with the tool.

In one aspect of the method, separating the first panel and the second panel with the tool may include inserting the tool between the first panel and the second panel through a joint formed by abutting surfaces of the first panel and the second panel. In another aspect of the method, separating the first panel and the second panel with the tool may include penetrating the first panel and the second panel with the tool from a direction that is generally perpendicular to the first panel and the second panel.

In yet another aspect of the method, a hole may be drilled through at least one of the first panel and the second panel before penetrating the first panel and the second panel with the tool.

A tool for injecting a liquid between a first panel and a second panel positioned flat against each other is provided. The tool includes a shaft that extends along a central axis between a first end and a second end. The shaft defines an internal passageway having an inlet and an outlet in fluid communication with each other. The inlet is disposed adjacent the first end of the shaft, and the outlet is disposed adjacent the second end of the shaft. A panel separating feature is coupled to the shaft. The panel separating feature is operable to engage and deform at least one of the first panel and the second panel, relative to the other of the first panel and the second panel, to separate the first panel and the second panel and form a pocket therebetween. The panel separating feature separates the first panel and the second panel and forms the pocket in response to axial movement of the shaft in a first direction along the central axis, to a first depth relative to a datum. A compression system is attached to the shaft, and is operable to compress the first panel and the second panel together in response to axial movement of the shaft to a second depth relative to the datum.

In one aspect of the tool, a fluid coupling is disposed in fluid communication with the inlet for connecting a source of the liquid to the passageway.

In another aspect of the tool, the panel separating feature includes at least one ridge disposed annularly about the shaft. In another aspect of the tool, the panel separating feature includes a plurality of ridges disposed annularly about the shaft. At least one of the plurality of ridges is angled relative to the central axis for grasping at least one of the first panel and the second panel in response to axial movement of the shaft along the central axis in the first direction. At least one of the plurality of ridges is angled relative to the central axis for grasping at least one of the first panel and the second panel in response to axial movement of the shaft along the central axis in a second direction.

In another aspect of the tool, the compression system includes a rivet having an annular body. At least one ridge is disposed on the annular body of the rivet. In another aspect of the tool, the shaft includes a head attached to the second end of the shaft. The head is operable to deform the annular body of the rivet in response to axial movement of the shaft in the second direction along the central axis.

In another aspect of the tool, the panel separating feature includes a flow form tip that is concentric with the central axis, and is disposed at the second end of the shaft.

In another aspect of the tool, the compression system may include a first thread form extending radially outward from the shaft relative to the central axis for engaging at least one of the first panel and the second panel in threaded engagement. Another aspect of the tool may include the compression system having a second thread form extending radially outward from the shaft relative to the central axis for engaging at least one of the first panel and the second panel in threaded engagement. The first thread form may include one of a clockwise thread and a counterclockwise thread, and the second thread form may include the other of the clockwise thread and the counterclockwise thread.

An alternative tool for injecting a liquid between a first panel and a second panel positioned flat against each other is also provided. The tool includes a shaft extending along a central axis between a first end and a second end. The shaft defines an internal passageway having an inlet and an outlet in fluid communication with each other. The inlet is disposed adjacent the first end of the shaft, and the outlet is disposed adjacent the second end of the shaft. A wedge is formed at the second end of the shaft for separating the first panel and the second panel when driven between the first panel and the second panel. A fluid coupling is disposed in fluid communication with the inlet for connecting a source of the liquid to the passageway.

Accordingly, the described method and different embodiments of the tool may be used to inject a liquid between two panels that require it, but validation efforts have determined that the liquid is missing. A liquid may be injected between the first panel and the second panel without completely disassembling the first panel from the second panel. The tool is used to form a pocket between the first tool and the second tool. The tool is then used to inject the liquid into the pocket, through the internal passageway. The pocket may then be compressed or flattened to wet-out the liquid and return the first panel and the second panel to their initial shape.

The above features and advantages and other features and advantages of the present teachings are readily apparent from the following detailed description of the best modes for carrying out the teachings when taken in connection with the accompanying drawings.

DETAILED DESCRIPTION

Figure 1:
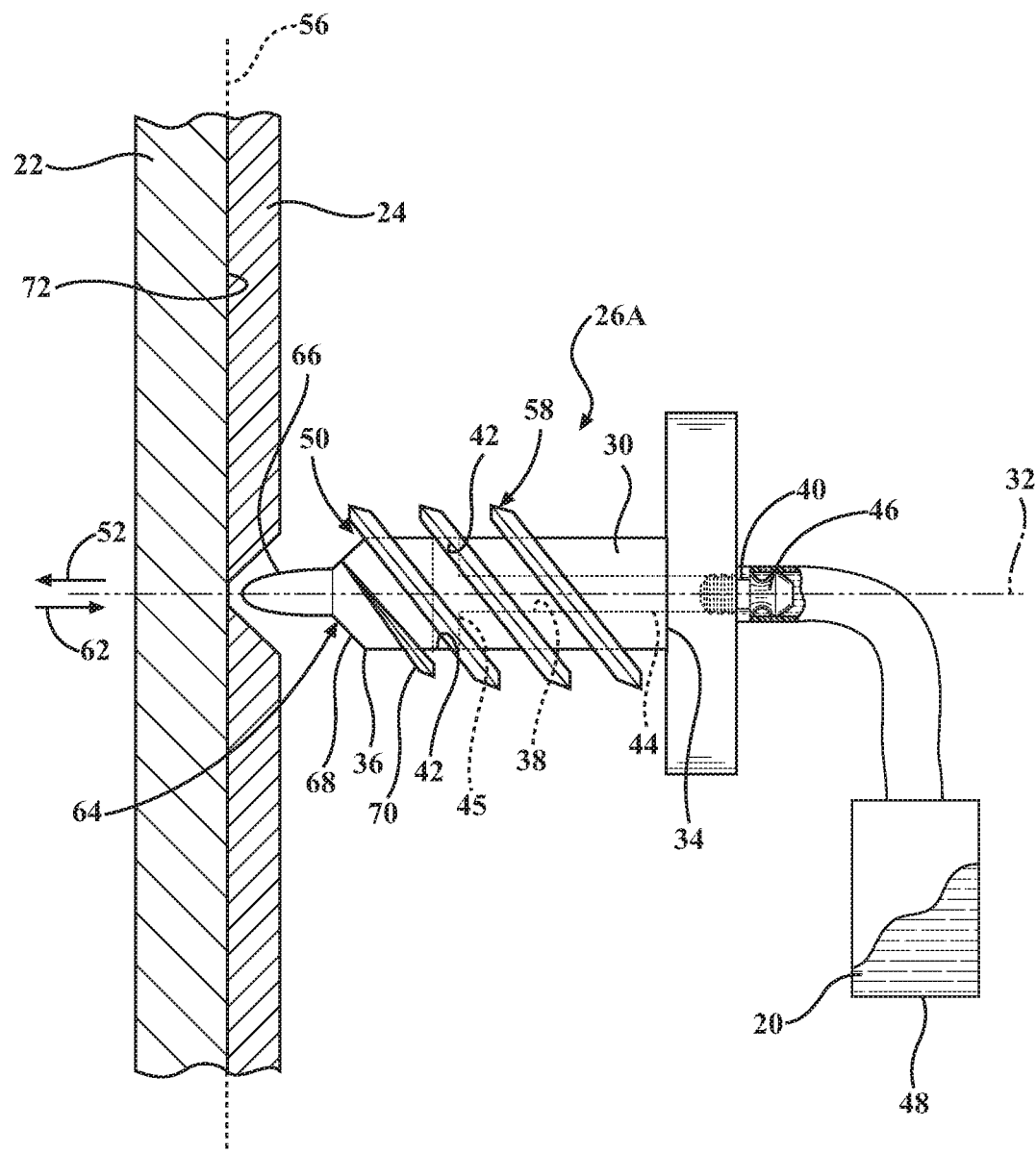
FIG. 1 is a schematic cross sectional view of a first embodiment of a tool in an initial position of a liquid injection process.

Those having ordinary skill in the art will recognize that terms such as "above," "below," "upward," "downward," "top," "bottom," etc., are used descriptively for the FIGS., and do not represent limitations on the scope of the disclosure, as defined by the appended claims. Furthermore, the teachings may be described herein in terms of functional and/or logical block components and/or various processing steps Referring to the FIGS., wherein like numerals indicate like parts throughout the several views, a method of injecting a liquid 20 between two adjacent panels, i.e., a first panel 22 and a second panel 24, is described. The liquid 20 may include, but is not limited to, any viscous or semi-viscous liquid 20. For example, the liquid 20 may include but is not limited to an adhesive for bonding the first panel 22 and the second panel 24 together, or a sealant for sealing between the first panel 22 and the second panel 24. A separating and injecting tool 26 is used to form a pocket 28, shown in FIGS. 2, 5 and 7, between the first panel 22 and the second panel 24, and then inject the liquid 20 into the pocket 28. The separating and injecting tool 26 may also be used to compress or flatten the pocket 28 after the liquid 20 is injected into the pocket 28.

The separating and injecting tool 26 is generally referred to within the written description as the tool 26. Different embodiments of the tool 26, suitable for use in accordance with the method described herein, are described in detail below. The different embodiments of the tool 26 are identified within the FIGS. and specifically referred to herein by their specific identifiers, i.e., a first embodiment of the tool is referred to specifically with the reference numeral 26A, a second embodiment of the tool is referred to specifically with the reference numeral 26B, a third embodiment of the tool is referred to specifically with the reference numeral 26C, and a fourth embodiment of the tool is referred to specifically with the reference numeral 26D. Accordingly, it should be appreciated that the reference numeral 26 is used generally to describe or refer to all of the first embodiment, 26A, second embodiment, 26B, third embodiment, 26C, and the fourth embodiment 26D, whereas the specific embodiments of the tool are referred to and shown in the FIGS. by their specific identifiers 26A, 26B, 26C, 26D respectively.

The tool 26 includes a shaft 30 extending along a central axis 32 between a first end 34 and a second end 36. The shaft 30 defines an internal passageway 38, which has an inlet 40 and an outlet 42. The inlet 40 and the outlet 42 of the internal passageway 38 are disposed in fluid communication with each other. The inlet 40 is disposed adjacent the first end 34 of the shaft 30, and the outlet 42 is disposed adjacent the second end 36 of the shaft 30. The internal passageway 38 may be shaped in any suitable manner. As shown in the exemplary embodiments of the tool 26, the internal passageway 38 includes a longitudinal segment 44, and a transverse segment 45. The longitudinal segment 44 and the transverse segment 45 are disposed in fluid communication with each other, and form a generally T-shaped passageway 38. The longitudinal segment 44 includes the inlet 40, and the transverse segment 45 includes the outlet 42. As shown, the transverse segment 45 includes two outlets 42, disposed on opposite lateral sides of the shaft 30. It should be appreciated that the internal passageway 38 may be shaped and/or configured differently than shown in the exemplary embodiments of the tool 26, and as described herein.

The tool 26 includes a fluid coupling 46 that is disposed in fluid communication with the inlet 40 of the internal passageway 38. The fluid coupling 46 connects the internal passageway 38 to a source 48 of the liquid 20. As shown in the exemplary embodiment, the fluid coupling 46 includes a "Zerk" fitting, and the inlet 40 of the internal passageway 38 is threaded to receive the fitting. Accordingly, the fluid coupling 46 is removable from the inlet 40. While the exemplary embodiments show and describe the fluid coupling 46 as a Zerk fitting, it should be appreciated that the fluid coupling 46 may include any type and/or configuration of coupling that provides a suitable connection for a pressurized fluid source 48. For example, the fluid coupling 46 may alternatively include a quick connect fluid coupling 46 or other similar device.

The tool 26 further includes a panel separating feature 50. The panel separating feature 50 is coupled to the shaft 30, and is operable to engage and deform at least one of the first panel 22 and the second panel 24 relative to the other of the first panel 22 and the second panel 24. The panel separating feature 50 engages one of the first panel 22 and the second panel 24 to separate the first panel 22 and the second panel 24 and form the pocket 28 therebetween. The pocket 28 is a space or void formed between the first panel 22 and the second panel 24, and having a pocket depth 29 between the first panel 22 and the second panel 24. The panel separating feature 50 separates the first panel 22 and the second panel 24 in response to axial movement of the shaft 30 in a first direction 52 along the central axis 32, to a first depth 54 relative to a datum 56. The datum 56 may include and/or be defined as any reference point or plane relative to the central axis 32. For example, the datum 56 may be defined as an edge of the panel assembly, i.e., the combined/joined edge of the first panel 22 and the second panel 24. Alternatively, the datum 56 may be defined as a surface of one of the first panel 22 or the second panel 24. It should be appreciated that the datum 56 is merely a reference location, and may be defined as any location relative to the central axis 32. The different embodiments of the tool 26 provide examples of different panel separating features 50. As such, the panel separating feature 50 of each embodiment of the tool 26 is described with reference to the FIG. showing that specific embodiment.

The tool 26 may further include a compression system 58. The compression system 58 may be attached to the shaft 30, and is operable to compress the first panel 22 and the second panel 24 together in response to axial movement of the shaft 30 to a second depth 60 relative to the datum 56. The axial movement of the shaft 30 to the second depth 60 may be in either the first direction 52 along the central axis 32, or a second direction 62 along the central axis 32. The second direction 62 being opposite to the first direction 52. The different embodiments of the tool 26 provide examples of different compression systems 58. As such, the compression system 58 of each embodiment of the tool 26 (if equipped with a compression system 58) is described with reference to the FIG. showing that specific embodiment. Furthermore, the panel separating feature 50 and the compression system 58 may share one or more components or features, and/or be integrated into the same components or features.

Figure 2:
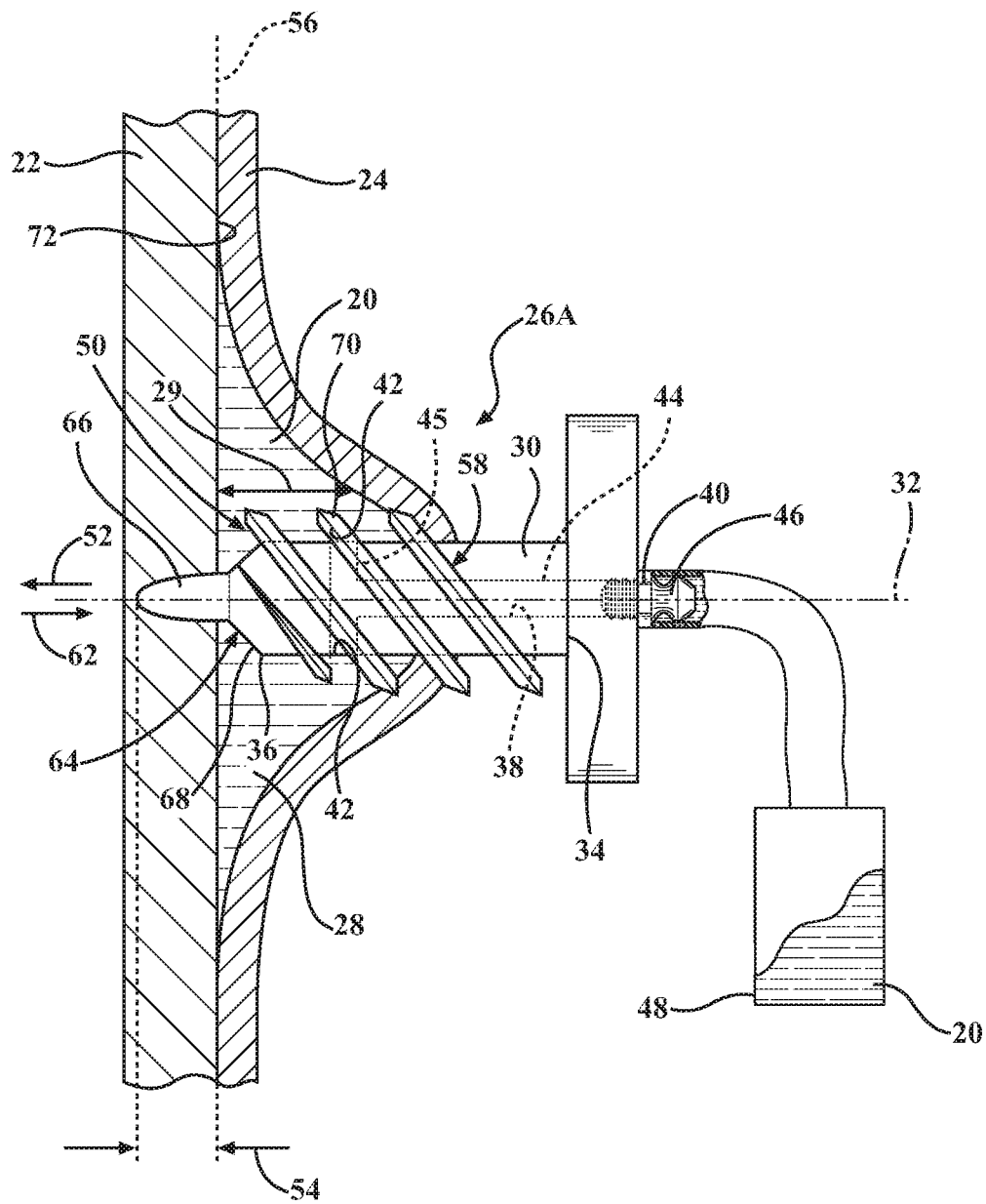
FIG. 2 is a schematic cross sectional view of the first embodiment of the tool in an intermediate position of the liquid injection process.
Figure 3:
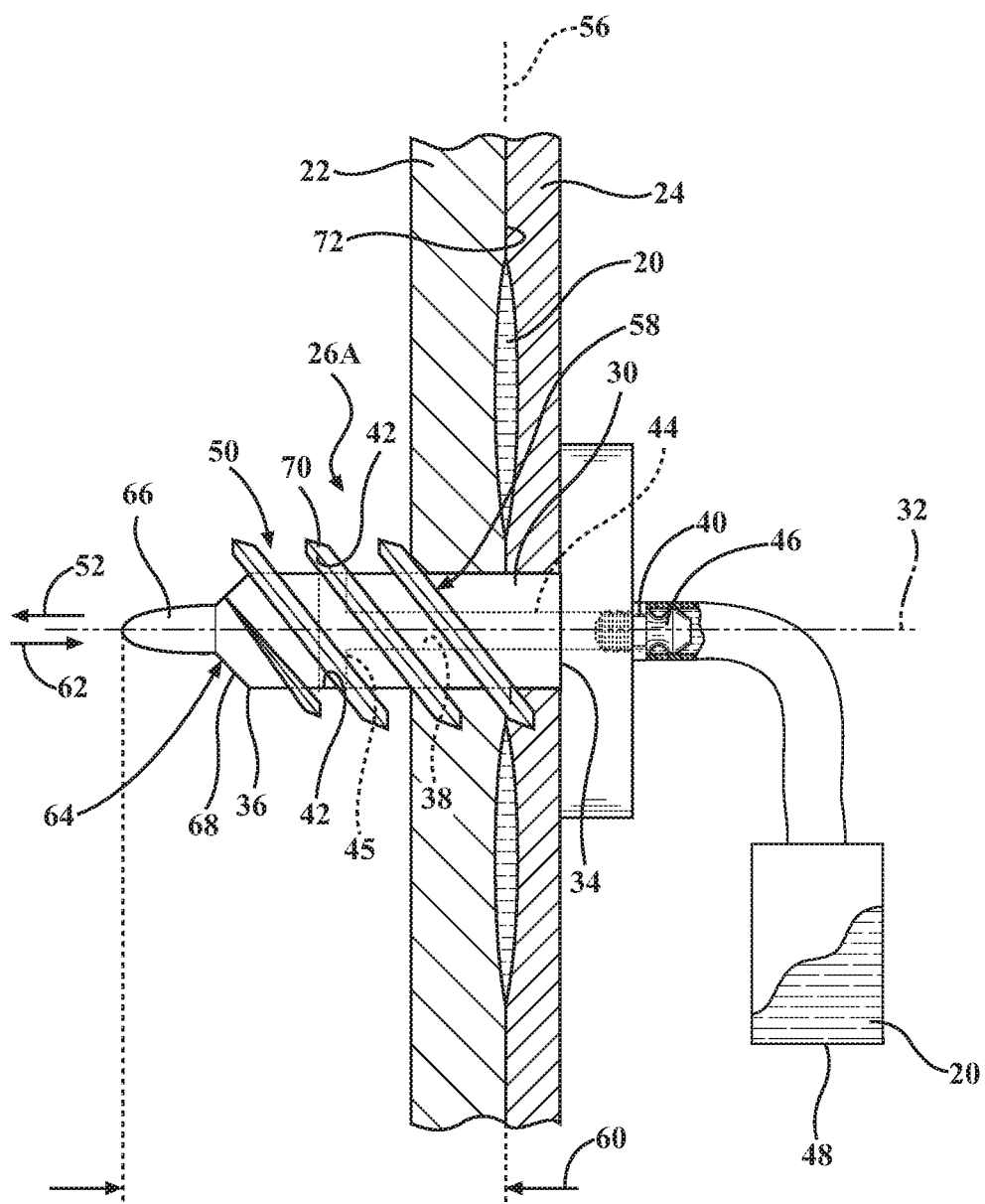
FIG. 3 is a schematic cross sectional view of the first embodiment of the tool in a compressed position of the liquid injection process.

Referring to FIGS. 1 through 3, the panel separating feature 50 of the first embodiment of the tool 26A includes a flow form tip 64 that is concentric with the central axis 32 of the shaft 30, and is disposed at the second end 36 of the shaft 30. The flow form tip 64 includes a cone portion 66, and a cone portion 68. The cone portion 66 is narrower and elongated along the central axis 32 relative to the cone portion 68. As such, the diameter of the cone portion 66 is less than the diameter of the cone portion 68. The cone portion 66 includes a rounded or blunted tip that provides some resistance against panel penetration. The cone portion 68 provides an increased amount of resistance against panel penetration than does the cone portion 66. The reason for the resistance against panel penetration is described in greater detail below.

The panel separating feature 50 of the first embodiment of the tool 26A further includes a first thread form, hereinafter referred to as the aggressive thread form 70. The aggressive thread form 70 is disposed on the shaft 30. The aggressive thread form 70 includes threads that extend radially outward from the shaft 30 relative to the central axis 32. Referring to FIG. 1, the first embodiment of the tool 26A is shown in an initial position, with the flow form tip 64 nearly contacting a joint surface 72 of the first panel 22. Referring to FIG. 2, the first embodiment of the tool 26A is shown in an intermediate position. FIG. 2 shows the cone portion 66 of the flow form tip 64 penetrating the first panel 22, with the cone portion 68 beginning to contact the joint surface 72 of the first panel 22. The flow form tip 64 provides resistance against penetrating the first panel 22, so that the aggressive thread form 70 on the shaft 30 may grab hold of the second panel 24 and pry or separate the second panel 24 from the first panel 22. Accordingly, it should be appreciated that movement of the shaft 30 in the first direction 52 in combination with rotation of the shaft 30 about the central axis 32 causes the flow form tip 64 to penetrate the first panel 22, but provides some resistance against penetration so that the aggressive thread form 70 may grab hold of the second panel 24. Continued rotation of the shaft 30 about the central axis 32 causes the second panel 24 to move along the aggressive thread form 70, while the cone portion 66 provides resistance against penetration into the first panel 22, thereby moving or separating the second panel 24 from the first panel 22 to form the pocket 28 therebetween.

The compression system 58 of the first embodiment of the tool 26A includes the aggressive thread form 70 used for the panel separating feature 50 described above. As noted above, the aggressive thread form 70 extends radially outward from the shaft 30 relative to the central axis 32 for engaging at least one of the first panel 22 and the second panel 24 in threaded engagement. As shown in FIG. 2, and as described above with reference to the panel separating feature 50 of the first embodiment of the tool 26A, the first embodiment of the tool 26A is shown in the intermediate position, with the flow form tip 64 providing resistance against penetration of the first panel 22, so that the aggressive thread form 70 may draw the second panel 24 away from the first panel 22 to form the pocket 28 therebetween. Referring to FIG. 3, the first embodiment of the tool 26A is shown in a compressed position, with the second panel 24 compressed or flattened back against the first panel 22. Increased rotational speed and pressure applied to the shaft 30 of the first embodiment of the tool 26A causes the cone portion 66 to penetrate the first panel 22, and the aggressive thread form 70 to engage the first panel 22 in threaded engagement. Continued rotation of the shaft 30 about the central axis 32 threads the shaft 30 into the first panel 22, thereby drawing or compressing the second panel 24 back flat against the first panel 22 to close the pocket 28.

Figure 4:
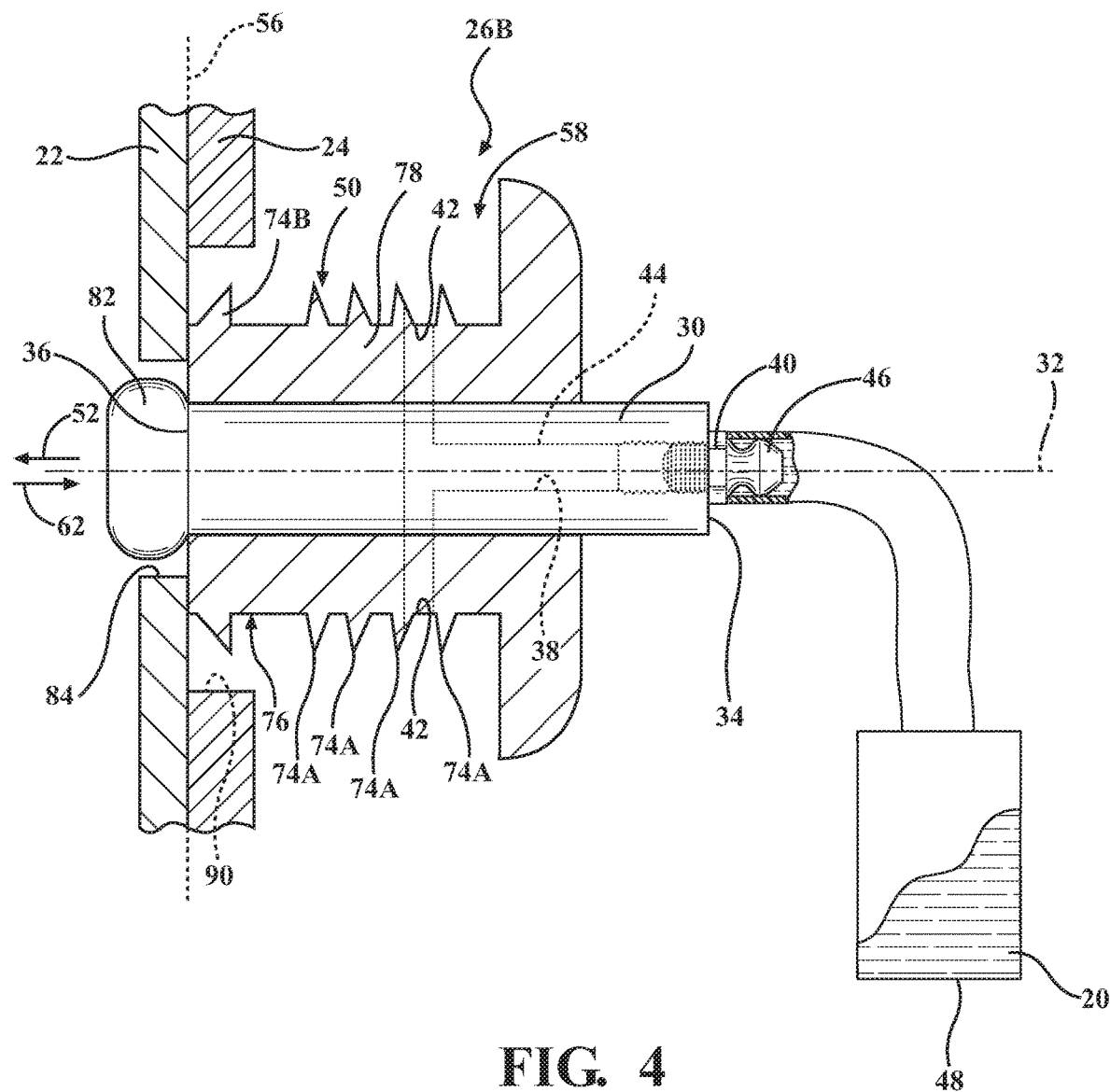
FIG. 4 is a schematic cross sectional view of a second embodiment of a tool in the initial position of the liquid injection process.
Figure 5:
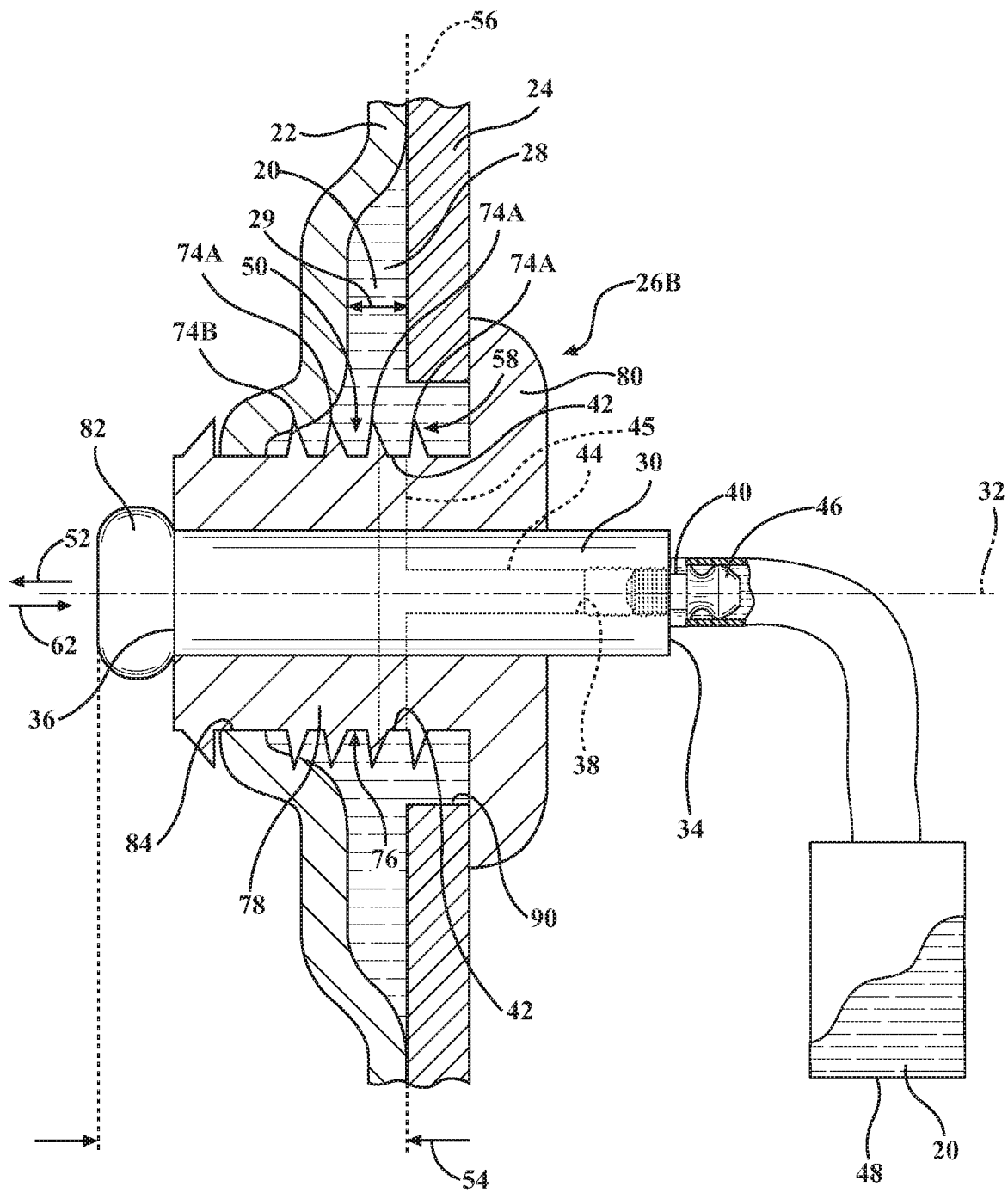
FIG. 5 is a schematic cross sectional view of the second embodiment of the tool in the intermediate position of the liquid injection process.
Figure 6:
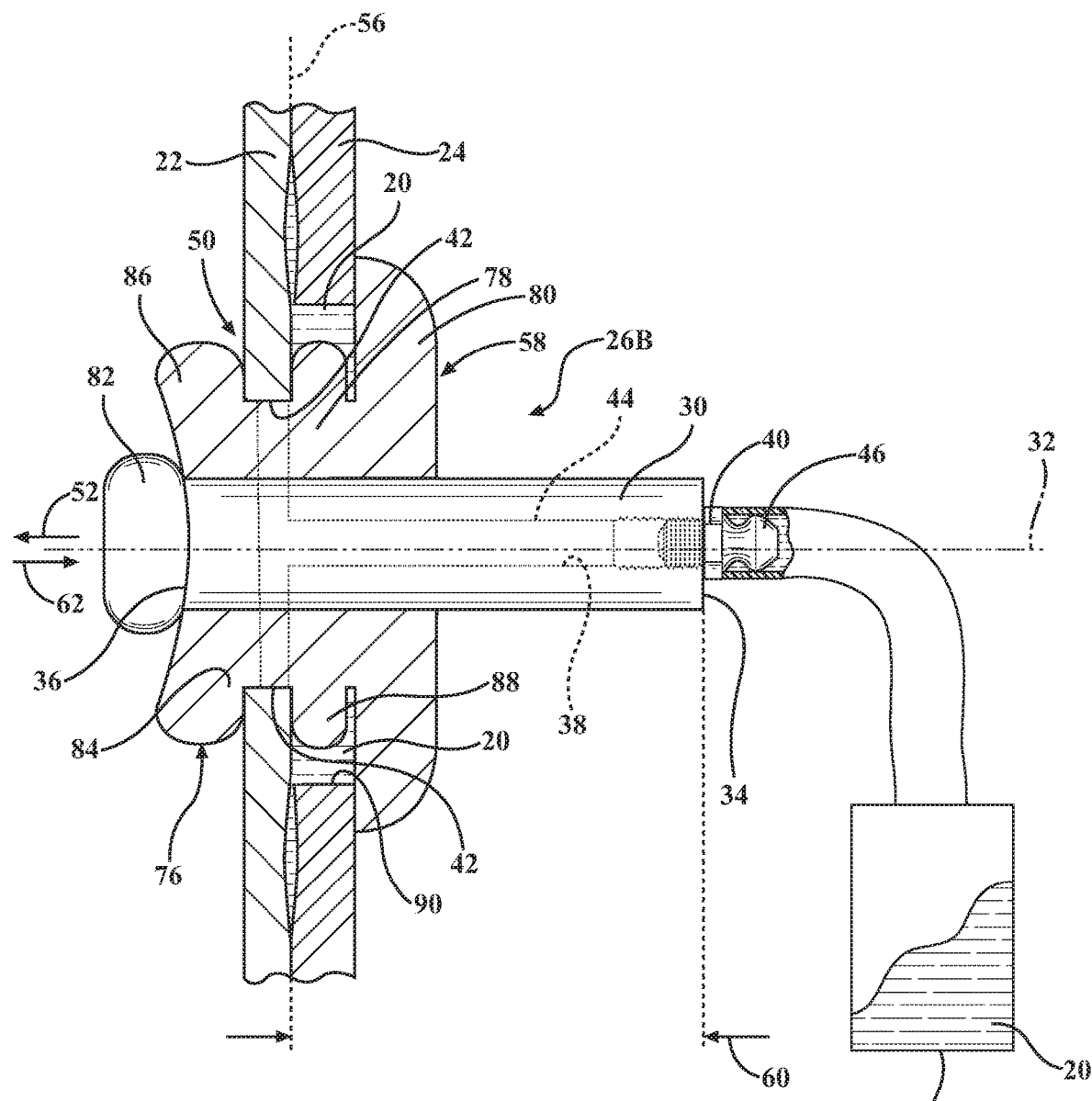
FIG. 6 is a schematic cross sectional view of the second embodiment of the tool in the compressed position of the liquid injection process.

Referring to FIGS. 4 through 6, the panel separating feature 50 of the second embodiment of the tool 26B includes at least one ridge 74A, 74B disposed annularly about the shaft 30. More specifically, the second embodiment of the tool 26B includes a rivet 76 having an annular body 78. The annular body 78 of the rivet 76 is disposed about the shaft 30, with the shaft 30 acting as a puller rod for the rivet 76. The ridges 74A, 74B are disposed on the annular body 78 of the rivet 76. The panel separating feature 50 may include any number of ridges 74A, 74B. For example, the panel separating feature 50 of the second embodiment of the tool 26B may include one ridge, two ridges, three ridges, etc. As shown in the second embodiment of the tool 26B, the panel separating feature 50 includes a plurality of ridges 74A, 74B. At least one of the plurality of ridges is a push ridge 74A, which is angled relative to the central axis 32 for grasping at least one of the first panel 22 and the second panel 24 in response to axial movement of the shaft 30 along the central axis 32 in the first direction 52. As shown in the second embodiment of the tool 26B, the panel separating feature 50 includes four push ridges 74A. The plurality of ridges may further include a pull ridge 74B, which is angled relative to the central axis 32 for grasping at least one of the first panel 22 and the second panel 24 in response to axial movement of the shaft 30 along the central axis 32 in the second direction 62. As shown in the second embodiment of the tool 26B, the axial endmost ridge, disposed nearest the second end 36 of the shaft 30, is configured as the pull ridge 74B.

The compression system 58 of the second embodiment of the tool 26B includes the rivet 76. The rivet 76 includes the annular body 78, and a flange portion 80. The shaft 30 includes a head 82, which is attached to the second end 36 of the shaft 30. The head 82 is operable to deform the annular body 78 of the rivet 76 in response to axial movement of the shaft 30 in the second direction 62 along the central axis 32.

Referring to FIG. 4, the second embodiment of the tool 26B is shown in an initial position, with an axial end of the annular body 78 of the rivet 76 positioned against the joint surface 72 of the first panel 22. Referring to FIG. 5, the second embodiment of the tool 26B is shown in an intermediate position. Axial movement of the shaft 30 from the initial position into the intermediate position pushes the annular body 78 of the rivet 76 through a pre-drilled hole 84 in the first panel 22. The panel separating feature 50 of the second embodiment of the tool 26B, i.e., the plurality of ridges 74A, 74B, grasp the first panel 22 as the annular body 78 of the rivet 76 is pushed through the pre-drilled hole 84, and push the first panel 22 away from the second panel 24, thereby forming the pocket 28 therebetween.

Referring to FIG. 6, the second embodiment of the tool 26B is shown in a compressed position, with the first panel 22 compressed or flattened back against the second panel 24. Once the annular body 78 and the shaft 30 have been pushed into the intermediate position, such as shown in FIG. 5, thereby forming the pocket 28, the shaft 30 may be moved in the second direction 62 along the central axis 32. The head 82 on the second end 36 of the shaft 30 engages the annular body 78. Additionally, at least one of the ridges e.g., the pull ridge 74B, engages the first panel 22 to grasp hold of and draw the first panel 22 back toward the second panel 24. As the shaft 30 and the head 82 are moved in the second direction 62 along the central axis 32, with the flange portion 80 restrained against axial movement along the central axis 32, the annular body 78 bulges or deforms radially outward relative to the central axis 32 to form an end holding portion 86 against the first panel 22, such that the end holding portion 86 and the flange portion 80 compress and secure the first panel 22 and second panel 24 therebetween, and flatten the pocket 28. The annular body 78 of the rivet 76 may additionally form an intermediate bulge 88, which may fill a pre-drilled hole 90 in the second panel 24.

Figure 7:
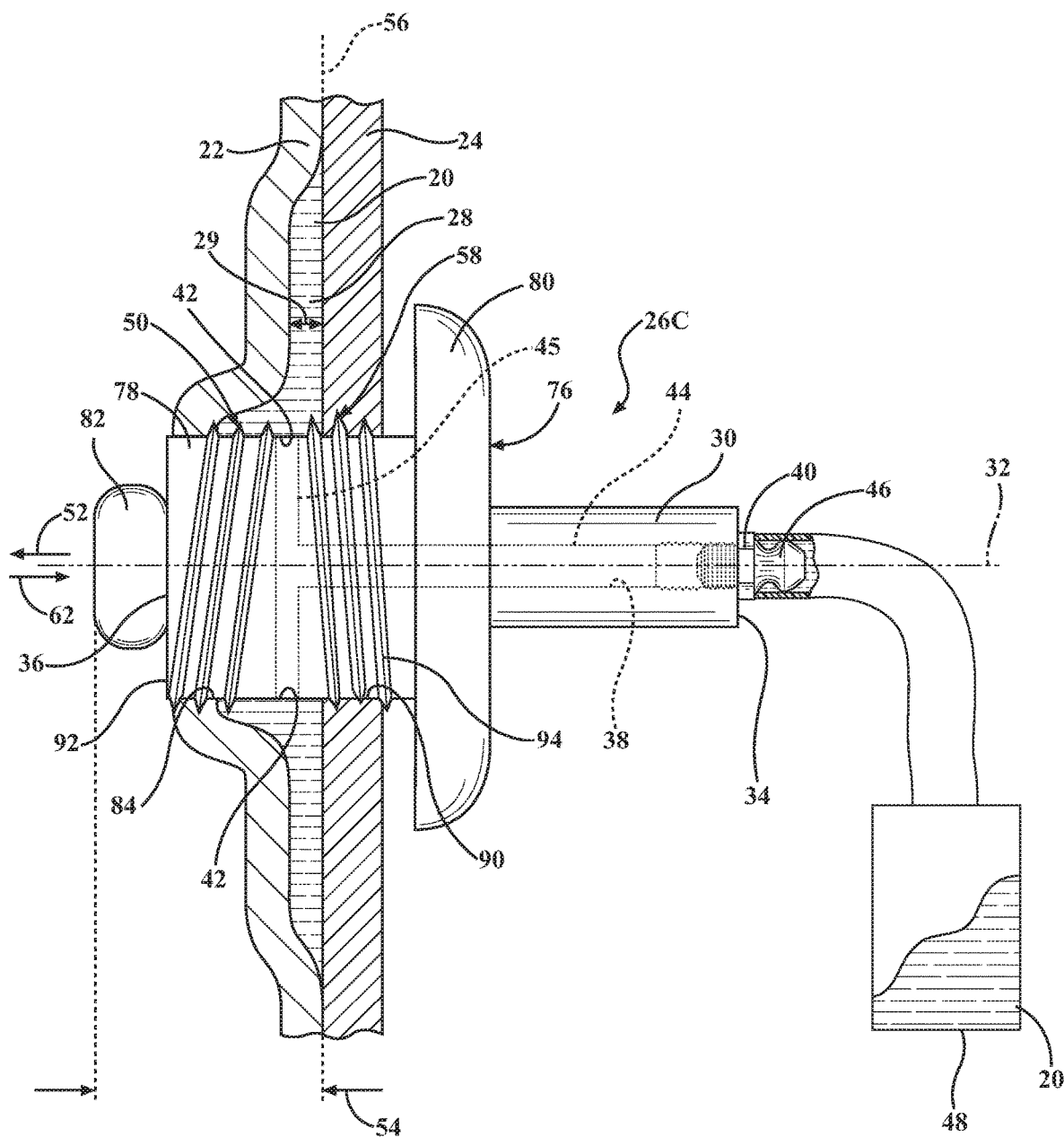
FIG. 7 is a schematic cross sectional view of a third embodiment of the tool in the intermediate position of the liquid injection process.

Referring to FIG. 7, the panel separating feature 50 of the third embodiment of the tool 26C includes a first thread form 92 and a second thread form 94. The compression system 58 of the third embodiment of the tool 26C includes a rivet 76. The rivet 76 includes an annular body 78, and a flange portion 80. The shaft 30 includes a head 82, which is attached to the second end 36 of the shaft 30. The head 82 is operable to deform the annular body 78 of the rivet 76 in response to axial movement of the shaft 30 in the second direction 62 along the central axis 32. The first thread form 92 and the second thread form 94 each extend radially outward from the annular body 78 of the rivet 76 relative to the central axis 32 for engaging at least one of the first panel 22 and the second panel 24 in threaded engagement. The first thread form 92 includes one of a standard or clockwise thread and a reverse or counterclockwise thread, and the second thread form 94 includes the other of the clockwise thread and the counterclockwise thread. For example, as shown in FIG. 7, the first thread form 92 includes a reverse or counterclockwise thread form, whereas the second thread form 94 includes a standard or clockwise thread form.

FIG. 7 shows the third embodiment of the tool 26C in an intermediate position. The opposing thread directions between the first thread form 92 and the second thread form 94 allow the third embodiment of the tool 26C to be threaded into a pre-drilled hole. The first thread form 92 is advanced through a pre-drilled hole 90 in the second panel 24 in the first direction 52 along the central axis 32, by rotating the annular body 78 of the rivet 76 in a first rotational direction. Once the first thread form 92 is threaded past the second panel 24, the annular body 78 of the rivet 76 is rotated in a second rotational direction, i.e., in an opposite rotational direction, to advance the second thread form 94 through the hole 90 in the second panel 24 in the first direction 52. As the annular body 78 of the rivet 76 is being rotated in the second rotational direction to advance the second thread form 94 through the pre-drilled hole 90 in the second panel 24, and move the shaft 30 in the first axial direction, the first thread form 92 is actively pushing against the first panel 22 to separate the first panel 22 from the second panel 24 and form the pocket 28 therebetween. It should be appreciated that in order to rotate the annular body 78 of the rivet 76, the flange portion 80 of the rivet 76 may need to be configured for engaging a tool 26. For example, the flange portion 80 may be configured with a hexagonal shape for engaging a wrench or a socket.

As the shaft 30 and the head 82 are moved in the second direction 62 along the central axis 32, with the flange portion 80 restrained against axial movement along the central axis 32, the annular body 78 bulges or deforms radially outward relative to the central axis 32 to form an end holding portion 86 against the first panel 22, such that the end holding portion 86 and the flange portion 80 compress and secure the first panel 22 and second panel 24 therebetween, and flatten the pocket 28.

The first embodiment of the tool 26A, the second embodiment of the tool 26B, and the third embodiment of the tool 26C, are all equipped with their respective compression systems 58, e.g., the aggressive thread form 70 or the rivet 76, which enable the compression and/or flattening of the pocket 28 after formation of the pocket 28. The fourth embodiment of the tool 26D is not equipped with a compression system 58.

Figure 8:
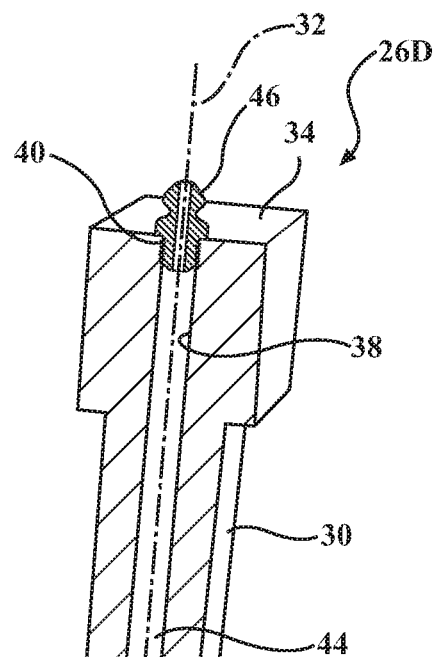
FIG. 8 is a schematic perspective cross sectional view of a fourth embodiment of the tool.
Figure 8:
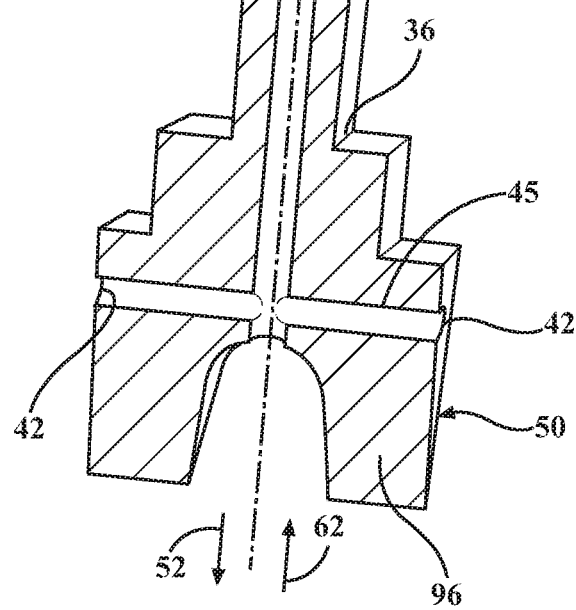
Figure 9:
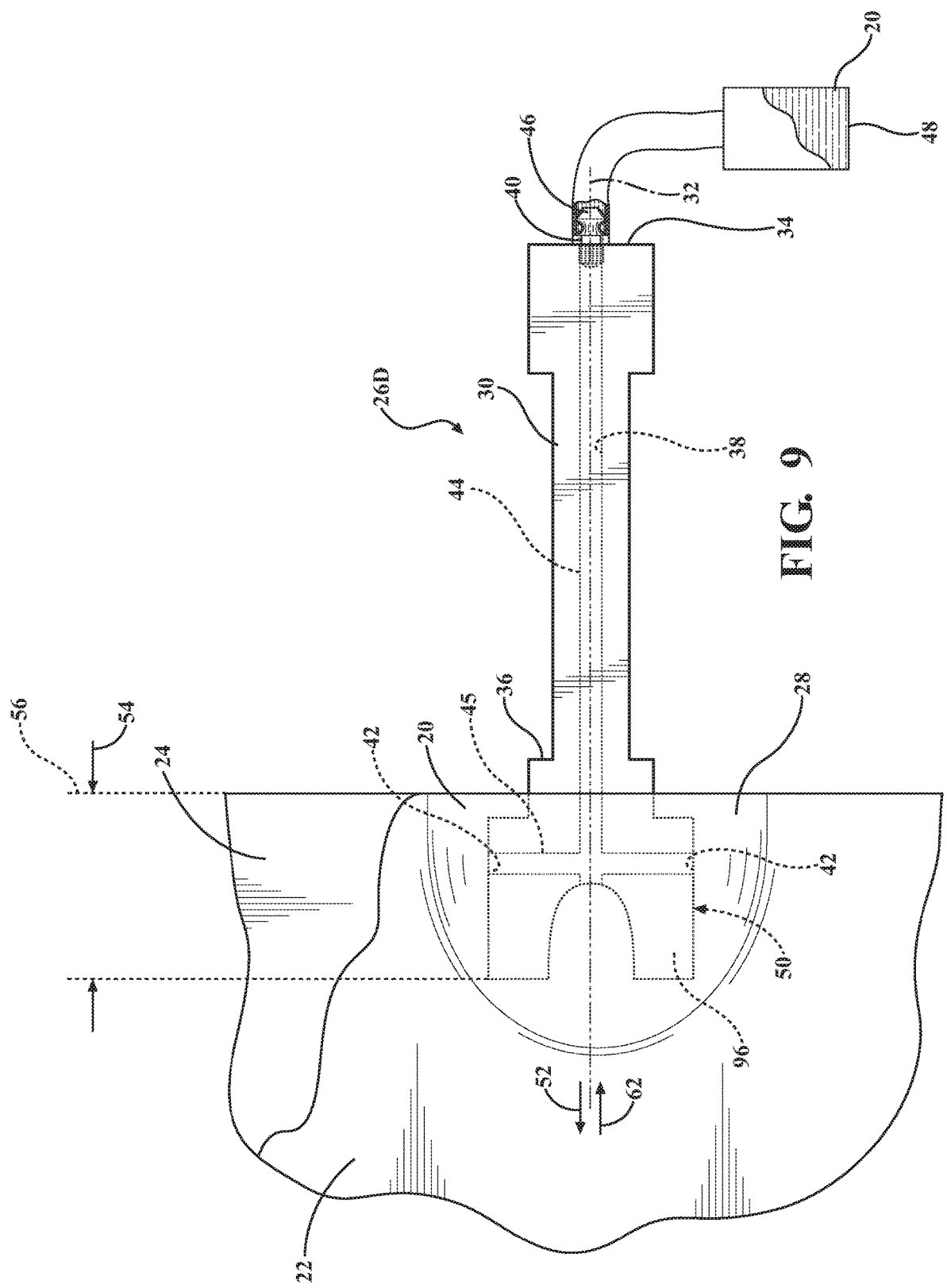
FIG. 9 is a schematic side view of the fourth embodiment of the tool in the intermediate position of the liquid injection process.

Referring to FIGS. 8 and 9, the fourth embodiment of the tool 26D is shown. The fourth embodiment of the tool 26D includes a wedge 96 formed at the second end 36 of the shaft 30. The wedge 96 separates the first panel 22 and the second panel 24 when driven between the first panel 22 and the second panel 24 in the first direction 52 along the central axis 32 of the shaft 30. The first embodiment of the tool 26A, the second embodiment of the tool 26B, and the third embodiment of the tool 26C all operate by penetrating the first panel 22 and the second panel 24 from a direction that is substantially perpendicular to the joint formed between the first panel 22 and the second panel 24 respectively, whereas the fourth embodiment of the tool 26D operates by inserting the wedge 96 between the first panel 22 and the second panel 24 in a direction that is generally parallel with the joint formed between the first panel 22 and the second panel 24 respectively. Accordingly, the wedge 96 is driven between the first panel 22 and the second panel 24 to separate the first panel 22 and the second panel 24, and thereby form the pocket 28 therebetween. The fourth embodiment of the tool 26D may be driven with a hammer, mallet, press, or other suitable device capable of applying a force along the central axis 32 of the shaft 30. It should be appreciated that the fluid coupling 46 may need to be removed prior to driving the wedge 96 into the joint between the first panel 22 and the second panel 24, and then re-installed once the wedge 96 is properly positioned within the pocket 28 with the outlet 42 of the internal passageway 38 positioned in fluid communication with the pocket 28 in order to inject the fluid into the pocket 28, as described in greater detail below.

As noted above, the tool 26 may be used to separate the first panel 22 and the second panel 24 to form the pocket 28 therebetween, inject the liquid 20 into the pocket 28, and possibly compress the first panel 22 and the second panel 24 together after the liquid 20 is injected to wet-out the liquid 20 and flatten the pocket 28. As used herein, the term "wet-out" is defined as the spreading or flowing outward of a liquid to increase a contact area between a surface and the liquid. The method described in detail below may use any of the first embodiment of the tool 26A, the second embodiment of the tool 26B, the third embodiment of the tool 26C, or the fourth embodiment of the tool 26D, to separate the first panel 22 and the second panel 24, and inject the liquid 20 into the pocket 28. However, only the first embodiment of the tool 26A, the second embodiment of the tool 26B, and the third embodiment of the tool 26C may be used to compress the first panel 22 and the second panel 24 together.

The method includes providing the tool 26 for separating the first panel 22 and the second panel 24, injecting the liquid 20 into the pocket 28, and in certain embodiments compressing the first panel 22 and the second panel 24 together. While four different embodiments of the tool 26 have been described in detail above and shown in the FIGS., it should be appreciated that the tool 26 may be configured differently than the embodiments of the tool 26 shown and described herein. Accordingly, the method described below may be practiced with one or more of the embodiments of the tool 26 described above, or with some other embodiment of the tool 26 not shown or described herein. As such, the method is not limited to only the embodiments of the tool 26 shown and described herein.

A hole may need to be pre-drilled through at least one of the first panel 22 and the second panel 24 to begin the process. For example, the first embodiment of the tool 26A, the second embodiment of the tool 26B, and the third embodiment of the tool 26C may require or preferably include at least one hole be pre-drilled at least partially through at least one of the first panel 22 and the second panel 24 before penetrating the first panel 22 and the second panel 24 with the tool 26, from a direction that is substantially perpendicular to the joint surface 72. Referring to the first embodiment of the tool 26A shown in FIGS. 1-3, a hole 90 is pre-drilled through the second panel 24, so that the flow form tip 64 may contact the first panel 22 when in the initial position. Referring to the second embodiment of the tool 26B and the third embodiment of the tool 26C, shown in FIGS. 4-7, a first hole 84 is pre-drilled through the first panel 22, and a second hole 90 is pre-drilled through the second panel 24. Referring to FIGS. 4-6, the second hole 90 includes a diameter that is large enough to allow the annular body 78 of the rivet 76 and the ridges 74A, 74B on the annular body 78 to pass through the second panel 24 unobstructed, whereas the first hole 84 includes a smaller diameter that allows the head 82 on the second end 36 of the shaft 30 to pass through the first panel 22, but small enough so that the annular body 78 and/or the ridges 74A, 74B engage the first panel 22. Referring to FIG. 7, the first hole 84 and the second hole 90 include similarly sized diameters that are large enough to allow the annular body 78 of the rivet 76 to pass through, but that engage the first thread form 92 and the second thread form 94 in threaded engagement.

The first panel 22 and the second panel 24 may then be separated with the tool 26, to form the pocket 28 between the first panel 22 and the second panel 24. As shown in FIGS. 2, 5, 7, and 9, the tool 26, and more specifically the shaft 30 are moved in the first direction 52 along the longitudinal axis until the pocket 28 is formed and the outlet 42 of the passageway 38 is positioned in fluid communication with the pocket 28. Referring to the first embodiment of the tool 26A, the second embodiment of the tool 26B, and the third embodiment of the tool 26C, separating the first panel 22 and the second panel 24 includes penetrating the first panel 22 and the second panel 24 with the tool 26 from a direction that is generally perpendicular to the first panel 22 and the second panel 24. Referring to the fourth embodiment of the tool 26D, separating the first panel 22 and the second panel 24 with the tool 26 includes inserting the tool 26 between the first panel 22 and the second panel 24 through a joint formed by abutting surfaces of the first panel 22 and the second panel 24.

Once the pocket 28 is formed and the outlet 42 of the internal passageway 38 is positioned in fluid communication with the pocket 28, the source 48 is connected to the inlet 40 of the passageway 38 via the fluid coupling 46 to supply the liquid 20 to the passageway 38. The source 48 may include, but is not limited to, a tank, line, or other vessel that contains the liquid 20 to be injected between the first panel 22 and the second panel 24. The manner in which the fluid coupling 46 is connected to the source 48 is dependent upon the specific type and/or configuration of the fluid coupling 46 used.

Referring to FIGS. 2, 5, 7, and 9, after the source 48 is connected to the fluid coupling 46, the liquid 20 is injected into the pocket 28 formed between the first panel 22 and the second panel 24, through the outlet 42 of the passageway 38 of the tool 26. Preferably, the liquid 20 is injected under pressure to ensure that the liquid 20 flows into the pocket 28. However, in some circumstances, the liquid 20 may be thin enough to simply flow into the pocket 28 via gravity, and need not be injected under pressure. The liquid 20 may be injected in any suitable manner, which is dependent upon the viscosity of the liquid 20.

Optionally, referring to FIGS. 3 and 6, after the liquid 20 has been injected into the pocket 28, the pocket 28 may be compressed or flattened to provide wet-out of the liquid 20. Compressing the first panel 22 and the second panel 24 together after the liquid 20 has been injected deforms or flattens the pocket 28, thereby generally restoring the first panel 22 and the second panel 24 to their respective original shapes, and spreads the liquid 20 out between the first panel 22 and the second panel 24. Additionally, compressing the first panel 22 and the second panel 24 may be desirable to ensure a proper bond or seal be formed between the first panel 22 and the second panel 24.

The first embodiment of the tool 26A, the second embodiment of the tool 26B, and the third embodiment of the tool 26C may be used as described above to compress the first panel 22 and the second panel 24 together. Alternatively, if the fourth embodiment of the tool 26D is used to separate the first panel 22 and the second panel 24 and inject the liquid 20 into the pocket 28, then the fourth embodiment of the tool 26D must be removed from the pocket 28 after the liquid 20 has been injected, after which the pocket 28 may be compressed with a compressor. The compressor may include a clamp, press, or other similar device that may compress the first panel 22 and the second panel 24 together to flatten the pocket 28 and wet-out the liquid 20.

The detailed description and the drawings or FIGS. are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of injecting a liquid between a first panel and a second panel positioned against each other, the method comprising:
   providing a tool defining a panel separation feature, a compression system and an internal passageway having an inlet and an outlet, wherein the outlet is disposed on a lateral side of the tool between a first end of the tool and a second end of the tool;
   moving the tool through the second panel and into a side of the first panel adjoining the second panel;
   separating the first panel and the second panel with the panel separation feature of the tool to form a pocket between the first panel and the second panel while the tool is being moved through the second panel;
   stopping the movement of the tool while the outlet of the passageway is positioned in fluid communication with the pocket; and
   injecting a liquid into the pocket formed between the first panel and the second panel through the outlet of the passageway of the tool after the tool has stopped moving.

2. The method set forth in claim 1, further comprising connecting a source to the inlet of the passageway to supply the liquid to the passageway.

3. The method set forth in claim 1, further comprising compressing the pocket after the liquid is injected into the pocket to provide wet-out of the liquid.

4. The method set forth in claim 3, further comprising removing the tool after injecting the liquid into the pocket and before compressing the pocket.

5. The method set forth in claim 4, wherein compressing the pocket is further defined as compressing the pocket with a compressor.

6. The method set forth in claim 3, wherein compressing the pocket is further defined as compressing the pocket with the compression system of the tool by further moving the tool through the second panel.

7. The method set forth in claim 1, wherein separating the first panel and the second panel with the tool is further defined as penetrating the first panel and the second panel with the tool from a direction that is generally perpendicular to the first panel and the second panel.

8. The method set forth in claim 7, wherein compressing the pocket is further defined as compressing the pocket with the compression system of the tool by penetrating the tool through the first panel.

9. The method set forth in claim 7, further comprising drilling a hole through the second panel before penetrating the second panel with the tool through the hole.

10. The method set forth in claim 1, wherein moving the tool through the second panel is defined as threading the tool into the second panel by rotating the tool.

11. The method set forth in claim 10, wherein separating the first panel from the second panel with the panel separation feature of the tool is defined as:
    further rotating the tool to engage the panel separation feature between the first panel and the second panel; and
    pulling the second panel away from the first panel with the panel separation feature.

12. The method set forth in claim 11, further comprising compressing the pocket with the compression system of the tool by moving the tool through the first panel and pulling the second panel to the first panel with the tool.

13. The method set forth in claim 12, further comprising securing the first panel to the second panel with the tool after the compression of the pocket.

14. The method set forth in claim 10, wherein separating the first panel from the second panel with the panel separation feature of the tool is defined as:
    further rotating the tool to engage the panel separation feature between the first panel and the second panel; and
    pushing the first panel in a first direction away from the second panel with the panel separation feature.

15. The method set forth in claim 14, further comprising compressing the pocket with the compression system of the tool by rotating the tool to pull the first panel in a second direction to the second panel with the tool, wherein the second direction is opposite the first direction.

16. The method set forth in claim 1, wherein moving the tool through the second panel is defined as pushing the tool in a first direction through a hole previously drilled in the second panel.

17. The method set forth in claim 16, wherein separating the first panel from the second panel with the panel separation feature of the tool is defined as:
    further moving the tool in the first direction to engage the panel separation feature between the first panel and the second panel; and
    pushing the first panel away from the second panel with the panel separation feature.

18. The method set forth in claim 17, further comprising compressing the pocket with the compression system of the tool by moving the tool in a second direction to pull the first panel to the second panel with the tool, wherein the second direction is opposite the first direction.

19. The method set forth in claim 18, further comprising securing the first panel to the second panel with the tool after the compression of the pocket.

* * * * *